US010197976B2

(12) United States Patent
Mailloux et al.

(10) Patent No.: US 10,197,976 B2
(45) Date of Patent: Feb. 5, 2019

(54) METHOD AND SYSTEM FOR MANAGING POWER DEMAND OF A PLURALITY OF CHARGING STATIONS SHARING THE SAME PORTION OF AN ELECTRICAL NETWORK

(71) Applicant: ADDENERGIE TECHNOLOGIES, INC., Quebec (CA)

(72) Inventors: Daniel Mailloux, Lac Beauport (CA); Louis Tremblay, Quebec (CA); Andre Garneau, Levis (CA)

(73) Assignee: Addenergie Technologies Inc., Quebec (CA)

( * ) Notice: Subject to any disclaimer, the term of this patent is extended or adjusted under 35 U.S.C. 154(b) by 554 days.

(21) Appl. No.: 14/543,149

(22) Filed: Nov. 17, 2014

(65) Prior Publication Data
US 2015/0346697 A1    Dec. 3, 2015

Related U.S. Application Data

(60) Provisional application No. 62/004,307, filed on May 29, 2014.

(51) Int. Cl.
*H02J 3/14* (2006.01)
*G05B 11/01* (2006.01)
(Continued)

(52) U.S. Cl.
CPC .......... *G05B 11/01* (2013.01); *B60L 11/1824* (2013.01); *B60L 11/1825* (2013.01); *B60L 11/1844* (2013.01); *B60L 11/1848* (2013.01); *H02J 7/007* (2013.01); *H02J 7/0027* (2013.01); *B60L 2230/10* (2013.01); *B60L 2230/40* (2013.01); *B60L 2240/72* (2013.01); *H02J 3/14* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/163* (2013.01);
(Continued)

(58) Field of Classification Search
CPC ......... H02J 7/007; H02J 3/14; Y02T 10/7005; Y02T 90/163; Y02T 90/168; Y02T 10/169; Y02T 10/729
See application file for complete search history.

(56) References Cited

U.S. PATENT DOCUMENTS

2010/0134067 A1* 6/2010 Baxter .................. B60L 3/0084
320/109
2011/0022259 A1* 1/2011 Niwa ..................... B60K 6/365
701/22
(Continued)

*Primary Examiner* — Alfonso Perez Borroto
*Assistant Examiner* — Esayas Yeshaw
(74) *Attorney, Agent, or Firm* — Foley & Lardner LLP

(57) ABSTRACT

A method and system are disclosed for managing power demand of a plurality of charging stations sharing the same portion of an electrical network, the method comprising obtaining an indication of a maximum value of power allowed at the portion of the electrical network; obtaining an indication of a current power consumed at the portion of the electrical network; managing a charging configuration of the plurality of charging stations to ensure that the current power consumed at the portion of the electrical network stays lower than the maximum value of power demand allowed.

16 Claims, 6 Drawing Sheets

(51) Int. Cl.
*B60L 11/18* (2006.01)
*H02J 7/00* (2006.01)

(52) U.S. Cl.
CPC ............ *Y02T 90/168* (2013.01); *Y02T 90/169* (2013.01); *Y04S 10/126* (2013.01); *Y04S 30/12* (2013.01); *Y04S 30/14* (2013.01); *Y10T 307/406* (2015.04)

(56) References Cited

U.S. PATENT DOCUMENTS

| | | | | |
|---|---|---|---|---|
| 2011/0133693 | A1* | 6/2011 | Lowenthal | B60L 11/1824 320/109 |
| 2012/0191242 | A1* | 7/2012 | Outwater | G06Q 30/06 700/236 |
| 2013/0110296 | A1* | 5/2013 | Khoo | B60L 11/1825 700/286 |
| 2014/0184170 | A1* | 7/2014 | Jeong | B60L 11/184 320/137 |
| 2014/0217976 | A1* | 8/2014 | McGrath | B60L 11/1837 320/109 |
| 2015/0081122 | A1* | 3/2015 | Yonetani | G06Q 50/06 700/291 |
| 2015/0130630 | A1* | 5/2015 | Outwater | G01D 4/006 340/870.02 |

\* cited by examiner

METHOD AND SYSTEM FOR MANAGING POWER DEMAND OF A PLURALITY OF CHARGING STATIONS SHARING THE SAME PORTION OF AN ELECTRICAL NETWORK

CROSS-REFERENCE TO RELATED APPLICATION

The present application claims the benefit of U.S. Provisional Patent Application No. 62/004,307, filed on May 29, 2014, which is incorporated herein by reference in its entirety for all purposes.

FIELD

The present disclosure relates to electronics. More precisely, the present disclosure pertains to a method and system for managing power demand of a plurality of charging stations sharing the same portion of an electrical network.

BACKGROUND

Providing charging stations for electric vehicles (EV) is very desirable.

The price of commercial intelligent public charging stations is usually considered to be quite high by potential customers.

On the other end, the operation of non-intelligent public charging stations can also be costly for various reasons.

The issue with prior art charging stations is that the operational cost can be very high. Electricity rates are different for business customers than for residential customers. Notably, the electricity rate depends on consumption patterns and power use. As a direct consequence, the impact from a charging station can be huge since it is integrated in the overall consumption of a building for instance. As a consequence, this may deter some building owners to provide charging stations in their premises.

There is therefore a need for a method and system for managing power demand that will overcome at least one of the above-identified drawbacks.

Features of the present disclosure will be apparent from review of the drawings and description below.

BRIEF SUMMARY

According to one aspect of the present disclosure, there is disclosed a method for managing power demand of a plurality of charging stations sharing a same portion of an electrical network, the method comprising obtaining an indication of a maximum value of power demand allowed at the portion of the electrical network; obtaining an indication of a current power consumed at the portion of the electrical network; managing a charging configuration of the plurality of charging stations to ensure that the current power consumed at the portion of the electrical network stays lower than the maximum value of power demand allowed.

According to an embodiment of the method, the obtaining of an indication of a maximum value of power allowed at the portion of the electrical network comprises sending a request to a remote management unit for obtaining an indication of a maximum value of power demand allowed for the plurality of charging stations and obtaining from the remote management unit the indication of a maximum value of power demand allowed for the plurality of charging stations.

According to an embodiment of the method, the obtaining of an indication of a maximum value of power demand allowed at the portion of the electrical network comprises accessing a memory unit and obtaining the indication of a maximum value of power demand from the memory unit.

According to an embodiment of the method, the indication of a maximum value of power demand is stored in the memory unit by a remote processing unit.

According to an embodiment of the method, the indication of a maximum value of power demand stored in the memory unit changes over time.

According to an embodiment of the method, the indication of a current power consumed at the portion of the electrical network is obtained from the memory unit.

According to an embodiment of the method, the indication of a current power consumed at the portion of the electrical network is obtained at a given frequency.

According to an embodiment of the method, the managing of a charging configuration of the plurality of charging stations to ensure that the current power consumed at the portion of the electrical network stays lower than the maximum value of power demand allowed comprises determining a charging configuration using the indication of a maximum value of power demand allowed at the portion of the electrical network and the indication of a current power consumed at the portion of the electrical network and providing the charging configuration.

According to an embodiment of the method, the method further comprises obtaining a priority list; further wherein the determining of the charging configuration is performed using the priority list obtained.

According to an embodiment of the method, the priority list is established using a plurality of parameters.

According to an embodiment of the method, the plurality of parameters is selected from a group comprising at least one of a user profile, a time of the day and a number of users connected.

According to an embodiment of the method, the priority list changes over time.

According to an embodiment of the method, the providing of the charging configuration comprises providing a signal to each charging station, the signal corresponding to a determined value of a corresponding power to deliver for each charging station i, the corresponding power to deliver being equal to $$\frac{X_i}{a_i}$$

wherein P is the power available, $a_i$ is a corresponding priority and $$P = \sum_{i=1}^{n} \frac{X_i}{a_i}.$$

According to an embodiment of the method, the indication of a maximum value of power demand stored in the memory unit is constant over time.

According to another aspect of the present disclosure, there is disclosed a controller for managing power demand of a plurality of charging stations sharing a same portion of an electrical network, the controller comprising a charging station communication port operatively connected to a plurality of charging stations; a memory unit for storing an indication of maximum value of power demand allowed and a charging station configuration; a processing unit operatively connected to the charging station communication port and to the memory unit, the processing unit for managing the charging station configuration of the plurality of charging stations to ensure that the current power consumed at the portion of the electrical network stays lower than the maximum value of power demand allowed.

According to an embodiment, the memory unit further comprises an indication of the current power consumed at the portion of the electrical network.

According to an embodiment, the controller further comprises a data providing unit communication port connected to the processing unit; the data providing unit communication port for obtaining the current power consumed from a remote processing unit and for storing the current power consumed at the portion of the electrical network in said memory unit.

According to an embodiment, the controller further comprises a remote management unit communication port connected to the processing unit; the remote management unit communication port for obtaining the indication of a maximum value of power demand allowed from a remote management unit and for storing the indication of the maximum value of power demand allowed in said memory unit.

According to an embodiment, the charging station configuration comprises a set of parameters characterizing each of the plurality of charging stations.

According to an embodiment, the set of parameters comprises a list of corresponding electrical power supplied to each charging station of the plurality of charging stations.

BRIEF DESCRIPTION OF THE DRAWINGS

In order that the present disclosure may be readily understood, embodiments of the present disclosure are illustrated by way of example in the accompanying drawings.

Further details of the present disclosure and its advantages will be apparent from the detailed description included below.

DETAILED DESCRIPTION

In the following description of the embodiments, references to the accompanying drawings are by way of illustration of an example by which the present disclosure may be practiced.

TERMS

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

In some embodiments, if a plurality of elements are sharing the same portion of an electrical network, the plurality of elements are located on the same branch circuit. In some embodiments, the plurality of elements are connected to the same distribution panel. In some embodiments, the plurality of elements are located at the same location. In some embodiments, the plurality of elements are connected to the same distribution grid.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed subject matter is widely applicable to numerous embodiments, as is readily apparent from the disclosure. One of ordinary skill in the art will recognize that the present disclosure may be practiced with various modifications and alterations, such as structural and logical modifications. Although particular disclosed features may be described with reference to one or more particular embodiments and/or drawings, it should be understood that such features are not limited to usage in the one or more particular embodiments or drawings with reference to which they are described, unless expressly specified otherwise.

The present disclosure is directed to a method and system for managing power demand of a plurality of charging stations sharing the same portion of an electrical network.

Figure 2:
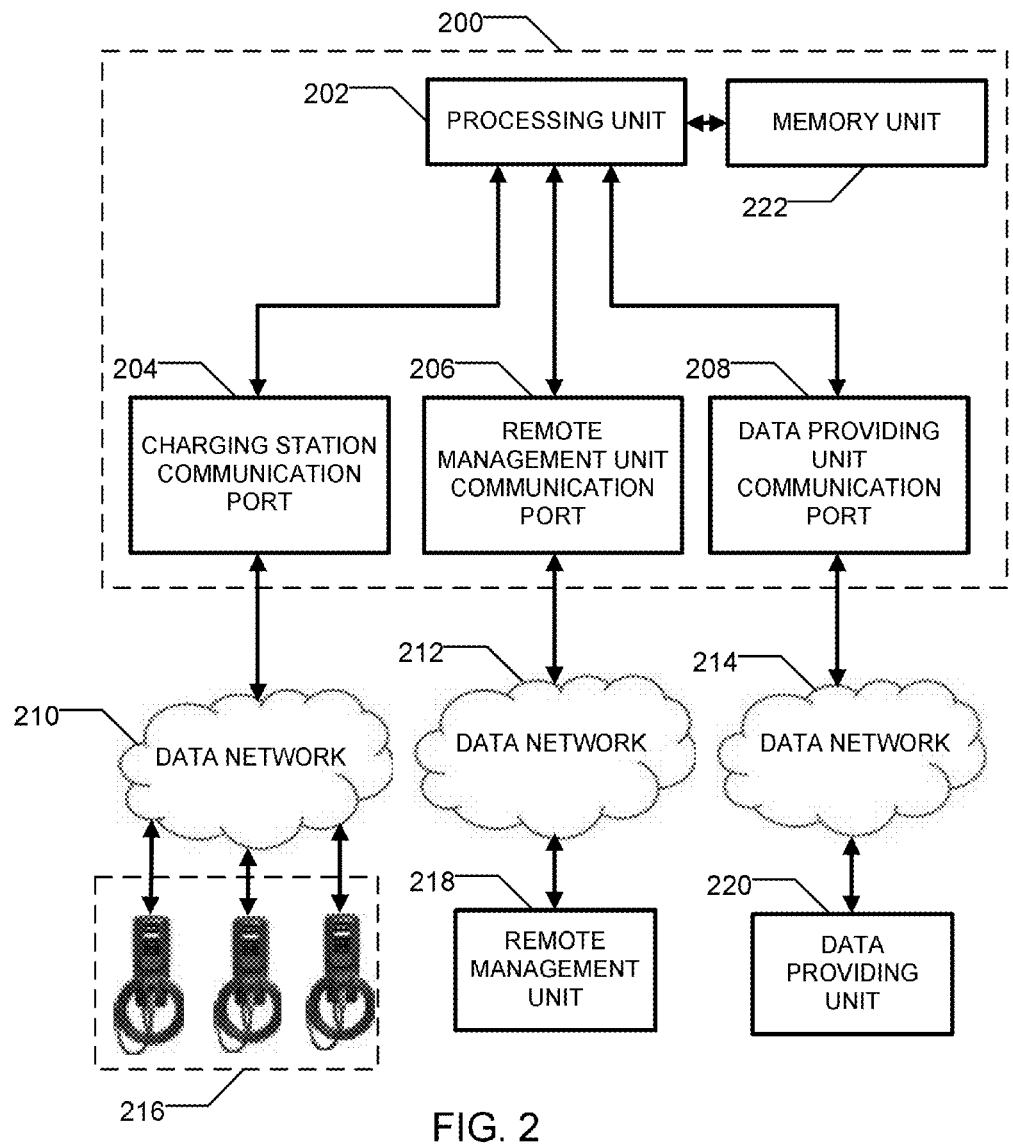
FIG. 2 is a block diagram that illustrates a system in which the method for managing power demand of a plurality of charging stations sharing the same portion of an electrical network may be implemented.

Now referring to FIG. 2, there is shown an embodiment of a system in which the method disclosed herein may be implemented.

In this embodiment, the system comprises a controller 200, a first data network 210, a second data network 206 and a third data network 208.

The system further comprises a plurality of charging stations 216, a remote management unit 218 and a data providing unit 220.

The plurality of charging stations 216 are used for providing electricity to an electric vehicle. It will be appreciated that a charging station may be of various types. In some embodiments, the charging station is the CoRe+ charging station manufactured by AddEnergie Technologies Inc. In some embodiments, the plurality of charging stations 216 operate according to the SAE J1772 standard.

The controller 200 is operatively connected to the plurality of charging stations 216 via the first data network 210.

The remote management unit 218 is used for optimizing the energy management of a building. The skilled addressee will appreciate that the remote management unit 218 may be of various types. In some embodiments, the remote management unit 218 is a building management system (BMS) manufactured by Delta Controls. In some embodiments, the remote management unit 218 can be accessed using the Building Automation and Control Networks (BACNet) protocol.

The data providing unit 220 is used for providing data. It will be appreciated that the data may be of various types. In some embodiments, the data provided comprises electrical data provided by sensors. More precisely, the data providing unit 220 comprises at least one sensor for measuring current that can be accessed over a TED™ interface for instance. In some embodiments, the data providing unit 220 comprises a Measuring Transmitting Unit (MTU) PRO and at least one current transformer (CT), manufactured by TED™. At least one current transformer can be used to read current measured at the main circuit breaker of the electric circuit supplying the portion of the electrical network. The skilled addressee will appreciate that the number of current transformers required depends on the number of electrical configuration of the location.

While both the data providing unit 220 and the remote management unit 218 have been shown in FIG. 2, it will be appreciated by the skilled addressee that only one of them may be required for the purpose of the method disclosed herein. As a consequence the data providing unit 220 may be used, for instance, when there is no remote management unit 218 in the system.

As explained further below, it will be appreciated that the controller 200 is used for controlling the plurality of charging stations 216 using data provided by at least one of the remote management unit 218 and the data providing unit 220.

It will be further appreciated by the skilled addressee that the controller 200 may be of various types.

In the embodiment illustrated in FIG. 2, the controller 200 comprises a processing unit 202, a charging station communication port 204, a remote management unit communication port 206, a data providing unit communication port 208 and a memory unit 222.

The processing unit 202 can be used for processing data and sharing data with the charging station communication port 204, with the remote management unit communication port 206, with the data providing unit communication port 208 and with the memory unit 222.

In one embodiment, the controller unit 200 is the ConnectPort X4 3G manufactured by Digi international.

The charging station communication port 204 is used for sharing data between the controller 200 and the plurality of charging stations 216 via the first data network 210.

It will be appreciated by the skilled addressee that the charging station communication port 204 may be of various types. In some embodiments, the charging station communication port 204 is a Zigbee™ port, such as when each charging station acts as a slave.

The remote management unit communication port 206 can be used for sharing data between the controller 200 and the remote management unit 218 via the second data network 212.

It will be appreciated by the skilled addressee that the remote management unit communication port 206 may be of various types. In one embodiment, the remote management unit communication port 206 is an Ethernet port.

The data providing unit communication port 208 is used for sharing data between the controller 200 and the data providing unit 220 via the third data network 214.

It will be appreciated by the skilled addressee that the remote data providing unit communication port 208 may be of various types. In one embodiment, the remote data providing unit communication port 208 is an Ethernet port.

The memory unit 222 is used for storing data. It will be appreciated that the memory unit 222 may be of various types. In some embodiments, the memory unit 222 stores, inter alia, an application for managing power demand of a plurality of charging stations sharing the same portion of an electrical network.

More precisely, the memory unit 222 stores instructions which when executed cause obtaining of a maximum value of power demand allowed at the portion of the electrical network.

The memory unit 222 further stores instructions which when executed cause obtaining an indication of a current power consumed at the portion of the electrical network.

The memory unit 222 further stores instructions which when executed cause the management of a charging configuration of the plurality of charging stations to ensure that the current power consumed at the portion of the electrical network stays lower than the maximum value of power demand allowed.

The memory unit 222 may further store data that can be used for the purpose of executing the application for managing power demand of a plurality of charging stations sharing a portion of an electrical network such as a priority list, an indication of the maximum value of power demand allowed, an indication of a current power consumed at the portion of the electrical network, a charging configuration, etc.

The controller 200 may be accessed remotely according to various embodiments. The controller 200 can be accessed by a remote processing unit, not shown. The remote processing unit may be used for managing the controller 200 from a remote location. The managing of the controller 200 may comprise sharing data with the controller 200. The remote processing unit may be also accessed over a data network, such as the Internet, by a user via a web interface. The remote processing unit may be used either by users or by a third party administering the system.

Figure 3:
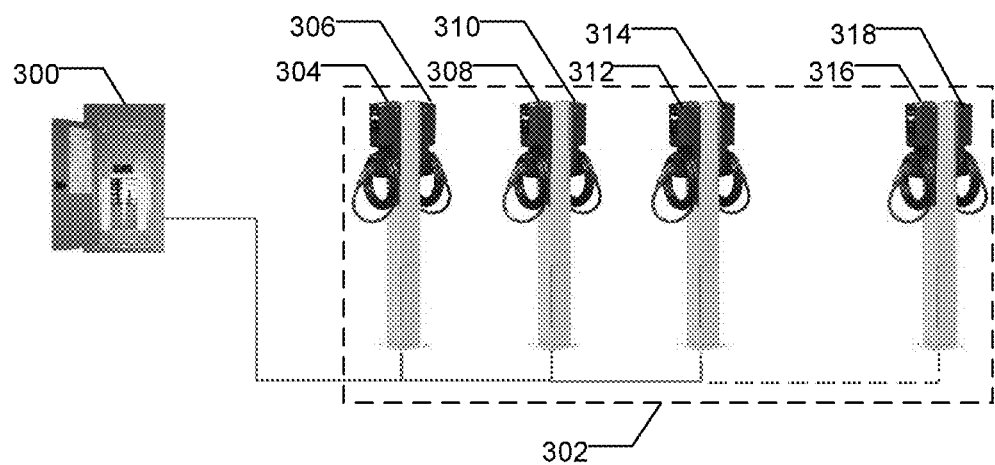
FIG. 3 is a schematic that illustrates a plurality of charging stations.

Now referring to FIG. 3, there is shown an embodiment of a system in which an electrical panel 300 is operatively connected to a plurality of charging stations 302.

In this embodiment, the plurality of charging stations comprises a first charging station 304, a second charging station 306, a third charging station 308, a fourth charging station 310, a fifth charging station 312, a sixth charging station 314, a seventh charging station 316, and an eighth charging station 318.

In some embodiments each of the first charging station 304, the second charging station 306, the third charging station 308, the fourth charging station 310, the fifth charging station 312, the sixth charging station 314, the seventh charging station 316, and the eighth charging station 318 are the Core+ charging station manufactured by AddEnergie Technologies Inc. The plurality of charging stations 302 can be connected in a daisy chain fashion. It will be appreciated that the plurality of charging stations 302 may be connected together using various techniques.

Figure 1:
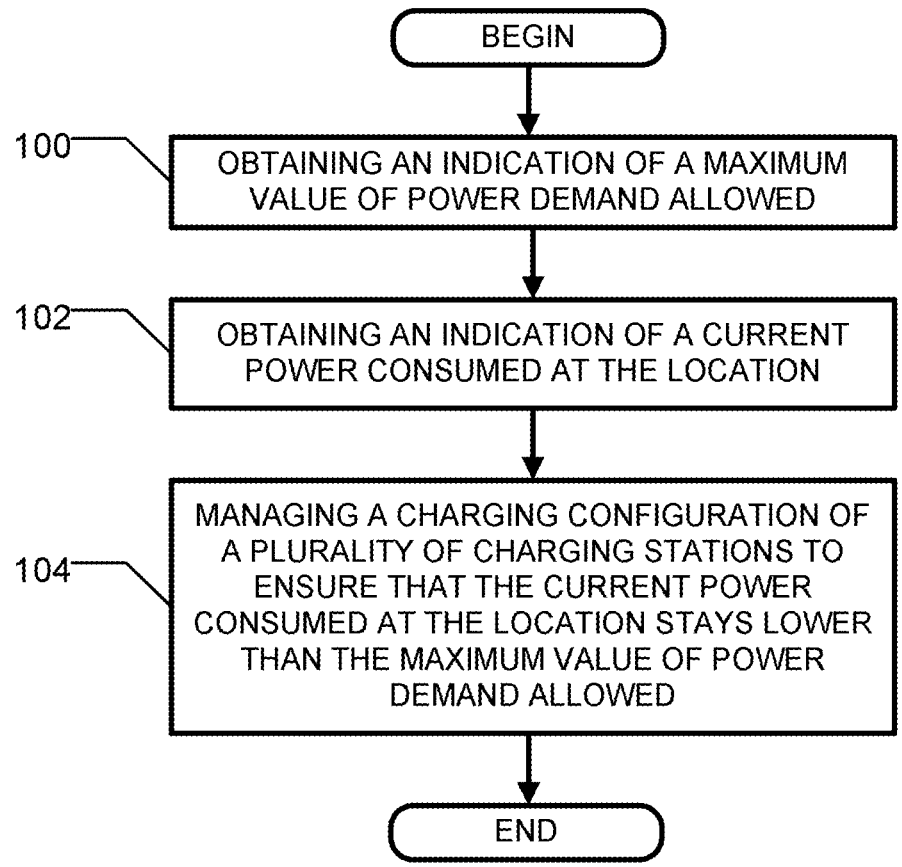
FIG. 1 is a flowchart that shows an embodiment of a method for managing power demand of a plurality of charging stations sharing the same portion of an electrical network.

Now referring to FIG. 1, there is shown an embodiment of a method for managing power demand of a plurality of charging stations.

According to processing step 100, an indication of a maximum value of power demand allowed is obtained.

Figure 5:
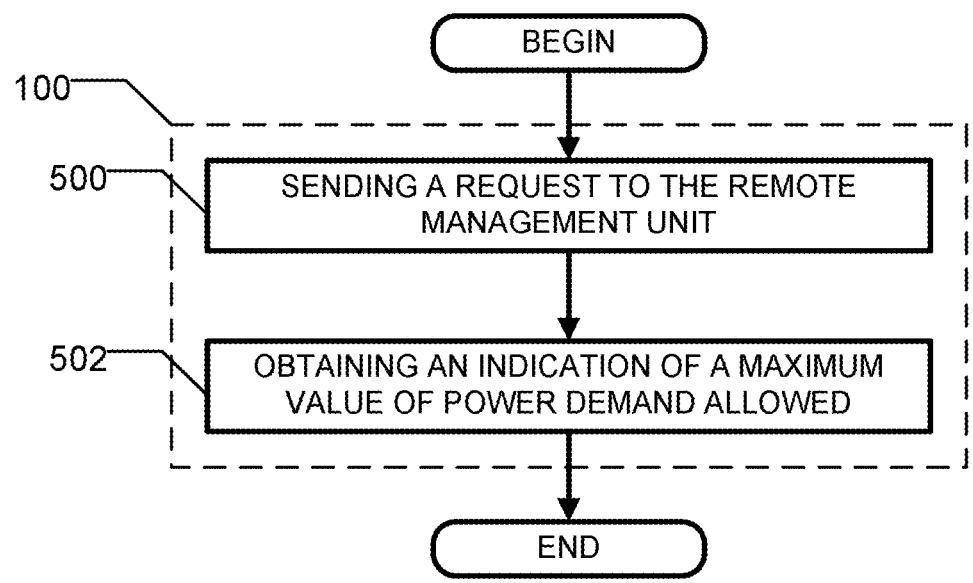
FIG. 5 is a flowchart that shows an embodiment for obtaining an indication of a maximum value of energy allowed.

Now referring to FIG. 5, there is shown an embodiment for obtaining an indication of a maximum value of power demand allowed. In this embodiment, a remote management unit 218 is used.

According to processing step 500, a request is sent to the remote management unit 218.

The request is sent to the remote management unit 218 by the processing unit 202 via the remote management unit communication port 206 and the second data network 212.

The request is for obtaining from the remote management unit 218 an indication of a maximum value of power demand allowed for the plurality of charging stations 21.

According to processing step 502, an indication of a maximum value of power demand allowed is obtained from the remote management unit 218. It will be appreciated that the indication of a maximum value of power demand allowed is obtained via the second data network 212 and the remote management unit communication port 206.

In some embodiments in which no remote management unit is available, the indication of a maximum value of power demand allowed may be obtained from the memory unit 222. It may be stored there according to various embodiments. For instance, it could be stored by a remote processing unit, not shown, operatively connected to the controller 200. Also it will be appreciated that the maximum value of power demand allowed could change over time.

Now referring back to FIG. 1 and according to processing step 102, an indication of a current power consumed at the portion of the electrical network is obtained.

It will be appreciated that the indication of a current power consumed at the portion of the electrical network may be obtained according to various embodiments.

In some embodiments, the indication of a current power consumed at the portion of the electrical network is obtained from the memory unit 222. The indication of the current power consumed by the plurality of charging stations can be obtained based on a time interval, such as at least every 30 sec.

Still referring to FIG. 1 and according to processing step 104, a charging configuration of the plurality of charging stations 216 is managed to ensure that the current power consumed at the portion of the electrical network stays lower than the maximum value of power demand allowed.

Figure 4:
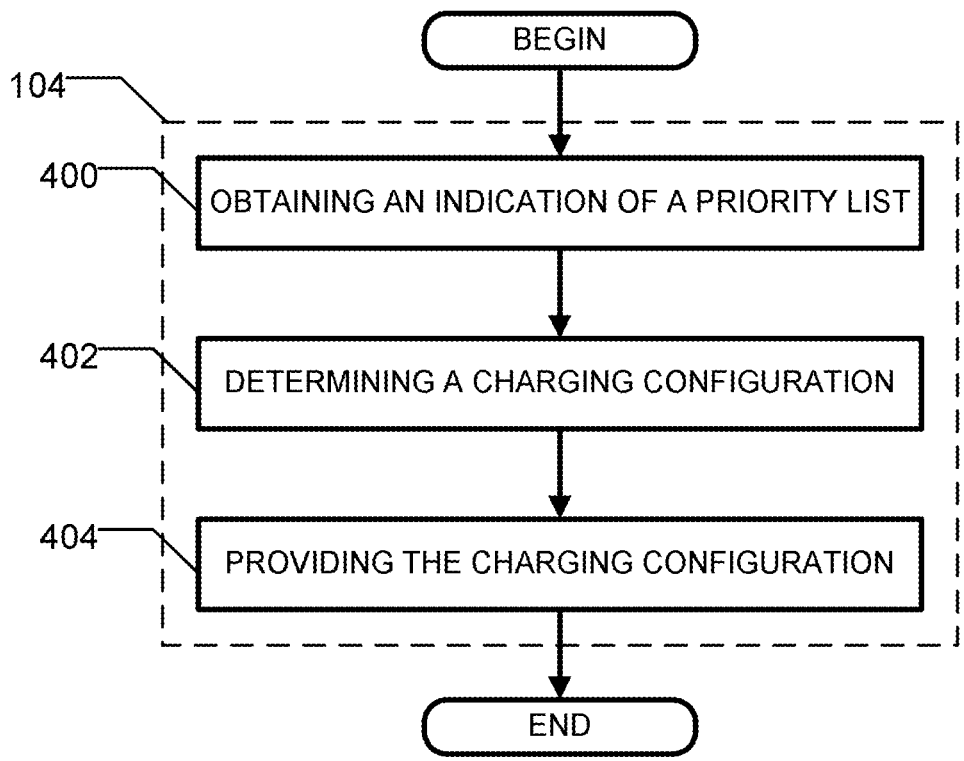
FIG. 4 is a flowchart that shows an embodiment for managing power demand of a plurality of charging stations sharing the same portion of an electrical network.

Now referring to FIG. 4, there is shown an embodiment for managing a charging configuration of a plurality charging stations to ensure that the current power consumed at the location stays lower that the maximum value of power demand allowed.

It will be appreciated that the charging configuration may be referred to as a set of parameters that are characterizing the plurality of charging stations.

In some embodiments, the set of parameters comprises a list of corresponding electrical power currently supplied by each charging station of the plurality of charging stations. It will be appreciated that this list may be advantageously obtained from the memory unit 222. The set of parameters may also comprise a list of maximum electrical power that can be dispensed by each of the plurality of charging stations. It will be appreciated that the maximum electrical power that can be dispensed may change depending on a type of electric vehicle connected to a charging station.

Now referring back to FIG. 2 and in one embodiment, the indication of a maximum power demand allowed is obtained from the remote management unit 218. More precisely, the indication of a maximum power demand allowed is obtained by the processing unit 202 of the controller 200 from the remote management unit 218 via the second data network 212. It will be appreciated that in this embodiment, the indication of a maximum power demand allowed may be obtained every minute.

In another embodiment, the indication of a maximum power demand allowed is derived from the data providing unit 220. More precisely, the indication of a maximum power demand allowed is calculated by the processing unit 202 of the controller 200 from the data providing unit 220 via the third data network 214. It will be appreciated that in this embodiment, the indication of a maximum power demand allowed may be calculated every 30 sec.

The skilled addressee will appreciate that various embodiments may be provided.

In some embodiments, referred to as a static mode, it is not an indication of maximum power demand allowed that is obtained but a fixed indication of a maximum power demand not to exceed.

According to processing step 400, an indication of a priority list is obtained. It will be appreciated that this processing step is optional since in one embodiment all users may have the same priority.

It will be appreciated that the indication of a priority list may be obtained according to various embodiments.

In one embodiment, the indication of a priority list is obtained from the memory unit 222. It will be appreciated that the memory unit 222 may be populated with the priority list according to various embodiments.

In some embodiments, the priority list is obtained from a remote location, not shown.

According to processing step 402, a charging configuration is determined.

In one embodiment, the charging configuration is determined using the priority list, the maximum value of power demand allowed for the plurality of charging stations and a maximum power than can be delivered at any given charging station of the plurality of charging stations.

A user may be provided with a given priority. The priority may be established using a plurality of parameters. The parameters may be selected, for instance, from a group consisting of a user profile, a time of day, a number of users connected, etc. It will be appreciated that the priority may be static, (e.g. not change over time) or dynamic (e.g. may change over time).

For instance and in one embodiment, an owner of a condo unit in a condo building may have a higher priority in a charging station of the condo building than a guest visiting an individual at the condo building. An individual may be given a higher priority also based on the use of its electric vehicle, etc.

In one embodiment, the priority is a number ranging from 1 to 3, wherein 1 is the highest priority.

The charging configuration is therefore determined by solving the following equation in one embodiment:

$$P = \sum_{i=1}^{n} \frac{X_i}{a_i},$$

wherein P is the power available, i is an identification of a charging station of the plurality of stations, n is the number of charging stations, $a_i$ is a priority coefficient varying from 1 to 3 in one embodiment and $X_i$ is a variable to solve. In this embodiment, a priority coefficient of 1 may be referred to as an absolute priority, while a priority coefficient of 2 may be referred to as a high priority and a priority coefficient of 3 may be referred to as a regular priority.

The power to deliver to each charging station i is equal to $$\frac{X_i}{a_i}.$$

According to processing step 404, the charging configuration is provided.

It will be appreciated by the skilled addressee that the charging configuration may be provided according to various embodiments.

In one embodiment, the charging configuration is provided by the processing unit 202 to each of the plurality of charging stations via the charging station communication port 204 and the first data network 210. It will be appreciated that the charging configuration is delivered by providing a signal to each charging station that will correspond to a determined value.

In some embodiments, the charging configuration is provided based on a time interval, such as every 30 s.

It will be appreciated that an indication of the power delivered to the plurality of charging stations may be provided by the controller 200 to the remote management unit 218 in the case where a remote management unit 218 is used.

Figure 6:
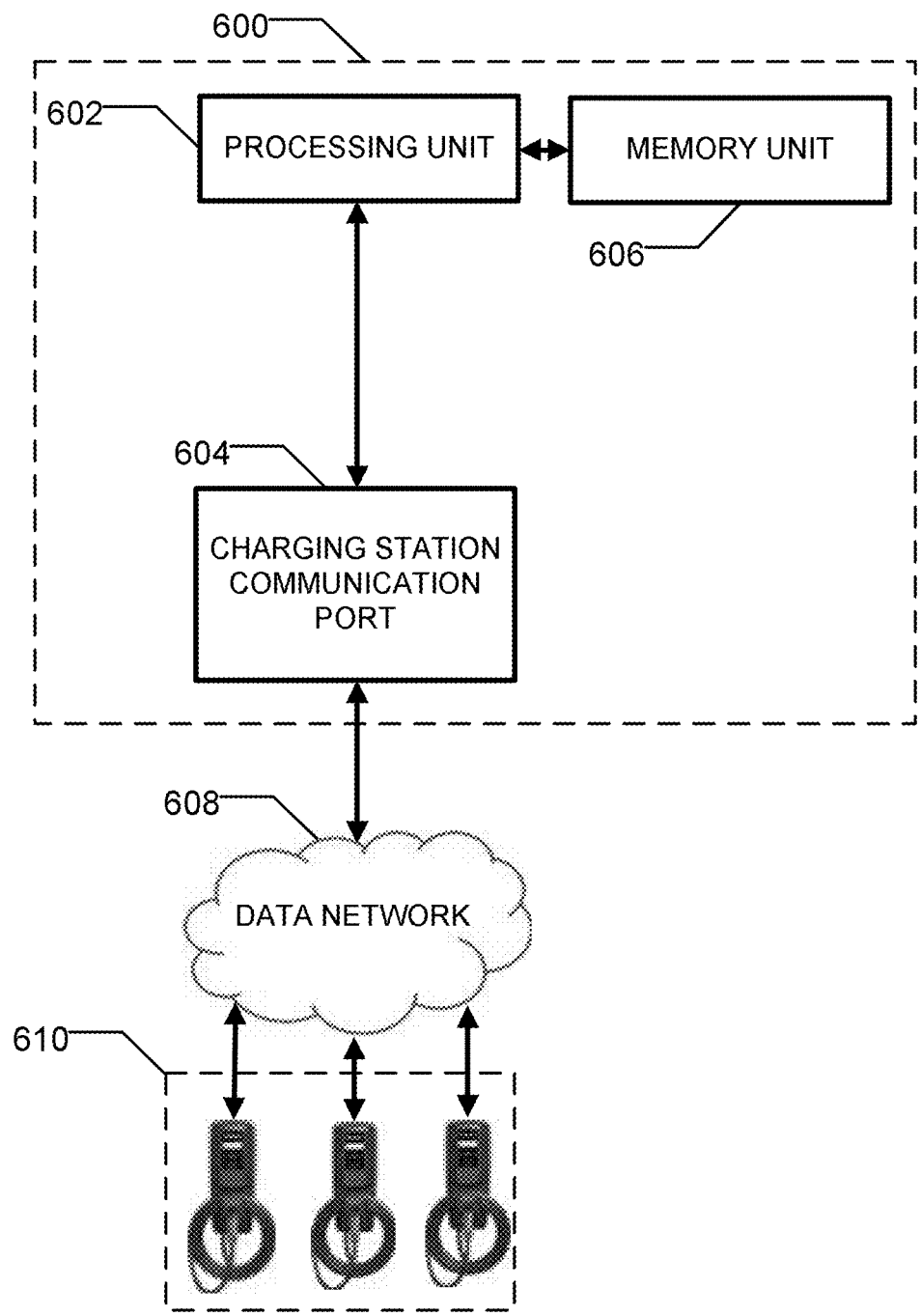
FIG. 6 is a block diagram which shows another embodiment of a system for managing power demand of a plurality of charging stations sharing the same portion of an electrical network.

Now referring to FIG. 6, there is shown an embodiment of a system for managing power demand of a plurality of charging stations sharing a same portion of an electrical network.

In this embodiment, the controller 600 comprises a processing unit 602, a memory unit 606 and a charging station communication port 604.

The system further comprises a first data network 608 and a plurality of charging stations 610.

The system illustrates an embodiment in which the maximum power demand than can be delivered is static. In some embodiments, there may be no need for either the remote management unit 218 or the data providing unit 220, both disclosed in FIG. 2. It will be however understood by the skilled addressee that the power provided to each charging station of the plurality of charging stations may change over time using the method disclosed herein.

An advantage of the method disclosed herein is that the distribution of power at a plurality of charging stations is managed so that the current power consumed does not exceed a maximum value of power demand allowed.

Although the above description relates to a specific preferred embodiment as presently contemplated by the inventor, it will be understood that the present disclosure in its broad aspect includes functional equivalents of the elements described herein.

The invention claimed is:

1. A method for managing power demand of a plurality of charging stations sharing a same portion of an electrical network, the method comprising:
   obtaining, by a controller, an indication of a maximum value of power demand allowed at the portion of the electrical network;
   obtaining, by the controller, from a current measuring unit, an indication of a current measured value of power consumed at a circuit breaker supplying power to the portion of the electrical network;
   managing, by the controller, a charging configuration of the plurality of charging stations to ensure that the current measured value of power consumed at the portion of the electrical network stays lower than the maximum value of power demand allowed;
   obtaining, by the controller, a priority list that changes over time;
   wherein managing the charging configuration of the plurality of charging stations comprises determining the charging configuration using the priority list and the indication of the maximum value of power demand allowed at the portion of the electrical network and the indication of the current measured value of power consumed at the portion of the electrical network; and
   providing, by the controller, the charging configuration, wherein providing the charging configuration comprises providing a signal to each charging station, the signal corresponding to a determined value of a corresponding power to deliver for each charging station i, the corresponding power to deliver being equal to $$\frac{X_i}{a_i}$$

wherein P is the power available, $a_i$ is a corresponding priority and $X_i$ is an amount of power defined such that $$P = \sum_{i=1}^{n} \frac{X_i}{a_i}.$$

2. The method as claimed in claim 1, wherein the obtaining, by the controller, the indication of the maximum value of power allowed at the portion of the electrical network comprises:
   sending, by the controller, a request to a remote management unit for obtaining an indication of the maximum value of power demand allowed for the plurality of charging stations; and
   obtaining, by the controller, from the remote management unit the indication of the maximum value of power demand allowed for the plurality of charging stations.

3. The method as claimed in claim 1, wherein the obtaining, by the controller, of the indication of the maximum value of power demand allowed at the portion of the electrical network comprises accessing, by the controller, a memory unit and obtaining the indication of the maximum value of power demand from the memory unit.

4. The method as claimed in claim 3, wherein the indication of the maximum value of power demand is stored in the memory unit by a remote processing unit.

5. The method as claimed in claim 3, wherein the indication of the maximum value of power demand stored in the memory unit changes over time.

6. The method as claimed in claim 3, wherein the indication of the current measured value of power consumed at the circuit breaker supplying power to the portion of the electrical network is obtained from the memory unit.

7. The method as claimed in claim 6, wherein the indication of the current measured value of power consumed at the circuit breaker supplying power to the portion of the electrical network is obtained at a given frequency.

8. The method as claimed in claim 1, wherein the priority list is established using a plurality of parameters.

9. The method as claimed in claim 8, wherein the plurality of parameters is selected from a group comprising at least one of a user profile, a time of the day and a number of users connected.

10. The method as claimed in claim 3, wherein the indication of the maximum value of power demand stored in the memory unit is constant over time.

11. A controller for managing power demand of a plurality of charging stations sharing a same portion of an electrical network, the controller comprising:
   a charging station communication port operatively connected to a plurality of charging stations;

a memory unit for storing an indication of maximum value of power demand allowed and a charging station configuration;

a processing unit operatively connected to the charging station communication port and to the memory unit, the processing unit for managing the charging station configuration of the plurality of charging stations to ensure that a current measured value of power consumed at a circuit breaker supplying power to the portion of the electrical network stays lower than the maximum value of power demand allowed;

wherein the processing unit is configured to obtain a priority list that changes over time;

wherein the processing unit is configured to manage the charging configuration of the plurality of charging stations comprising determining the charging configuration using the priority list and the indication of the maximum value of power demand allowed at the portion of the electrical network and the indication of the current measured value of power consumed at the portion of the electrical network; and wherein the processing unit is configured to provide the charging configuration, wherein providing the charging configuration comprises providing a signal to each charging station, the signal corresponding to a determined value of a corresponding power to deliver for each charging station i, the corresponding power to deliver being equal to $$\frac{X_i}{a_i}$$

wherein P is the power available, $a_i$ is a corresponding priority and $X_i$ is an amount of power defined such that $$P = \sum_{i=1}^{n} \frac{X_i}{a_i}.$$

12. The controller as claimed in claim 11, wherein the memory unit further comprises an indication of the current measured value of power consumed at the portion of the electrical network.

13. The controller as claimed in claim 12, further comprising a data providing unit communication port connected to the processing unit; the data providing unit communication port for obtaining the current measured value of power consumed from a remote processing unit and for storing the current measured value of power consumed at the portion of the electrical network in said memory unit.

14. The controller as claimed in claim 12, further comprising a remote management unit communication port connected to the processing unit; the remote management unit communication port for obtaining the indication of a maximum value of power demand allowed from a remote management unit and for storing the indication of the maximum value of power demand allowed in said memory unit.

15. The controller as claimed in claim 12, wherein the charging station configuration comprises a set of parameters characterizing each of the plurality of charging stations.

16. The controller as claimed in claim 15, wherein the set of parameters comprises a list of corresponding electrical power supplied to each charging station of the plurality of charging stations.

* * * * *

UNITED STATES PATENT AND TRADEMARK OFFICE
CERTIFICATE OF CORRECTION

PATENT NO. : 10,197,976 B2
APPLICATION NO. : 14/543149
DATED : February 5, 2019
INVENTOR(S) : Mailloux et al.

It is certified that error appears in the above-identified patent and that said Letters Patent is hereby corrected as shown below:

In the Specification

Column 2, Line 48, delete "$X_i$" and insert --$X$--.

Column 2, Line 57, delete "$X_i$" and insert --$X$--.

Column 8, Line 48, delete "$X_i$" and insert --$X$--.

Column 8, Line 63, delete "$X_i$" and insert --$X$--.

In the Claims

Claim 1, Column 10, Line 9, delete "$X_i$" and insert --$X$--.

Claim 1, Column 10, Line 17, delete "$X_i$" and insert --$X$--.

Claim 11, Column 11, Line 32, delete "$X_i$" and insert --$X$--.

Claim 11, Column 12, Line 5, delete "$X_i$" and insert --$X$--.

Signed and Sealed this
Twenty-fourth Day of May, 2022

Katherine Kelly Vidal
*Director of the United States Patent and Trademark Office*